(12) United States Patent
Shibasaki et al.

(10) Patent No.: US 6,349,102 B1
(45) Date of Patent: Feb. 19, 2002

(54) DATA TRANSMISSION METHOD BY POLLING AND TERMINAL APPARATUS FOR USE IN THE METHOD

(75) Inventors: Tomoki Shibasaki; Akio Murata, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/035,907

(22) Filed: Mar. 6, 1998

(30) Foreign Application Priority Data

Jun. 9, 1997 (JP) .............................................. 9-151416

(51) Int. Cl.[7] ................................................. H04J 3/14
(52) U.S. Cl. ........................................ 370/463; 370/522
(58) Field of Search ................................ 370/449, 455, 370/443, 444, 447, 431, 461, 463, 464, 465, 475, 522, 389, 462; 340/825.06, 825.07, 825.08

(56) References Cited

U.S. PATENT DOCUMENTS

| 4,654,483 A | * | 3/1987 | Imai et al. | |
|---|---|---|---|---|
| 4,847,834 A | | 7/1989 | Bryant | |
| 5,175,730 A | * | 12/1992 | Murai | |
| 5,175,869 A | | 12/1992 | Murata | |
| 5,434,861 A | | 7/1995 | Pritty et al. | |
| 5,535,214 A | * | 7/1996 | Shiobara | |
| 5,581,707 A | | 12/1996 | Kuecken | |
| 5,694,543 A | * | 12/1997 | Ionue | 370/449 |
| 6,032,185 A | * | 2/2000 | Asano | 709/227 |
| 6,246,696 B1 | * | 6/2001 | Yamaguchi et al. | 370/475 |

\* cited by examiner

*Primary Examiner*—Huy D. Vu
(74) *Attorney, Agent, or Firm*—Armstrong, Westerman, Hattori, McLeland & Naughton, LLP

(57) ABSTRACT

A data transmission method in which a transmission request is forwarded from a host apparatus to a terminal apparatus. When receiving the transmission request, the terminal apparatus forwards as communication request to the host apparatus. In this communication request, a timer value of asa system timer included in the terminal apparatus is incorporated. Having received the communication request including the timer value, the host apparatus establishes an ID for the terminal apparatus according to the timer value. Then, the host apparatus conducts polling for collecting data from the terminal apparatus using the established ID.

9 Claims, 9 Drawing Sheets

Fig.11

| TERMINAL STATION | ID (TIMER VALUE) |
|---|---|
| 2a | ○○' ××" △△ |
| 2b | △△' ××" ∞ |
| 2c | ○○' ××" ○○ |
| ⋮ | ⋮ |
| 2n | ○○' ××" ×× |

DATA TRANSMISSION METHOD BY POLLING AND TERMINAL APPARATUS FOR USE IN THE METHOD

BACKGROUND OF THE INVENTION

1. Field of the Invention

The present invention relates to a data transmission method by polling and a terminal apparatus for use in the method. In particular, it relates to a method and a terminal apparatus in which an identifier (ID) of the terminal apparatus for polling can be changed easily.

In recent years, data transmission systems, in which a plurality of terminal apparatuses are connected with a host apparatus to execute a data transmission between them, have been widely used. In these transmission systems, a plurality of terminal apparatuses are connected simultaneously to a communication line, and data transmission is carried out by a host apparatus conducting polling of a corresponding terminal apparatus.

2. Description of the Related Art

Data transmission in a conventional method using the data transmission systems mentioned above has been carried out, in general, as described below.

The host apparatus conducts polling of the respective terminal apparatuses using their respective IDs by asking if they have data to be transmitted to the host apparatus. Each terminal apparatus monitors the line for its own ID. If a terminal apparatus having data to be transmitted to the host apparatus detects its own ID, it forwards a communication request to the host apparatus. Thus, communication between the host apparatus and the terminal apparatus is established to transmit data.

Identification information (identifier, referred to as an ID below) is unique to the respective terminal apparatus and is registered by the host apparatus at an initial stage of the data transmission procedure.

Since IDs in a conventional system have been uniquely given to the respective terminal apparatus, as mentioned above, the following problems have arisen.

For example, when a system as described above is constructed, new IDs should be determined for the respective terminal apparatus which will be connected to a host apparatus of the system. In addition, the newly determined IDs of the respective terminal apparatus should be registered to the host apparatus. These procedures to determine and register the respective IDs of the terminal apparatus in the data transmission system are not easy and require the efforts of a system engineer. In addition, when introducing more terminal apparatuses to the system later, the same procedures mentioned above should be repeated to determine and register the IDs of the new terminal apparatuses.

Further, since terminal apparatuses incorporated in the system sometimes break down, the broken ones must be replaced. Thus, the determination and registration of IDs mentioned above should be carried out again for the replaced apparatuses. If an ID which is different from that of the broken apparatus is determined at the replacement, ID management for the system becomes complicated, thus increasing the burden on a system engineer.

As explained above, by uniquely and fixedly determining an ID for each terminal apparatus, the time required for ID management increases and a large effort is necessary to re-establish new IDs in the data transmission system.

SUMMARY OF THE INVENTION

The present invention was made to overcome the above mentioned problems of the prior art. Therefore, the object of the present invention is to provide a data transmission method whose ID management is easier than a conventional method and which is able to omit a reestablishing procedure of a new ID when a terminal apparatus is replaced with a new one.

Another object of the present invention is to provide a terminal device which is suitable for use in the data transmission method of the present invention.

In order to achieve the above-mentioned object, the present invention provides a data transmission method for transmitting data in a system having a host apparatus (host station) and at least one terminal apparatus (terminal station) connected to the host apparatus. In this method, first, the host apparatus forwards a transmission request to the terminal apparatus. Then, corresponding to this transmission request, the terminal apparatus sends back a communication request to the host apparatus. In this communication request, a timer value of a system timer, which is incorporated in the terminal apparatus, is included. Having received the communication request including the timer value, the host apparatus establishes an ID for the terminal apparatus according to the timer value. Then, the host apparatus conducts polling for collecting data from the terminal apparatus using the established ID.

According to the above feature, the method of the present invention does not require fixed determination of an ID of the terminal apparatus, thus overcoming the problems of the prior art methods mentioned previously. In recent years, particularly, devices used to construct terminal apparatuses usually contain a system timer, and therefore, little effort is required to construct a terminal apparatus which can be used with the data transmission method of the present invention.

In another feature of the present invention, the host apparatus compares timer values of respective terminal apparatuses when the system includes a plurality of terminal apparatus and some of them forward communication requests simultaneously in response to a transmission request sent by the host apparatus. Then, the host apparatus gives a priority to one of the terminal apparatuses according to the compared result and establishes an ID for the terminal apparatus having a priority according to its timer value.

Due to the above feature, the present invention is able to give the priority to one of the terminal apparatuses by a very easy procedure. Therefore, the host apparatus is not required to keep information regarding which terminal apparatus has priority and other information regarding the priority sequence among a plurality of terminal apparatuses. Accordingly, the present invention can flexibly deal with the replacement of a terminal apparatus or addition of more terminal apparatus in a data transmission system.

In still another feature of the present invention, the timer value itself is established as the ID.

In still another feature of the present invention, a terminal apparatus is provided which is suitable for use with the transmission methods mentioned above. This terminal apparatus comprises a timer for counting time intervals, a memory for storing a value of said timer when the terminal apparatus can communicate with the host apparatus, and a controller for forwarding a reply to a transmission request which is received from the host apparatus, said controller incorporating said timer value into a reply and forwarding it to the host apparatus.

In still another feature of the present invention, a further terminal apparatus is provided which is suitable for use with the data transmission methods mentioned above. This terminal apparatus is comprised of a communication adapter connected with the host apparatus through a communication line and a portable terminal which is connectable with the host apparatus through said communication adapter, said portable terminal including, a timer for counting time intervals, a memory for storing a value in said timer when the terminal apparatus can communicate, and a controller for forwarding a reply to a transmission request which is received from the host apparatus, said controller incorporating said timer value into the reply and forwarding it to the host apparatus through said communication adapter.

In still another feature of the present invention, a host apparatus is provided which is suitable for use with the data transmission methods mentioned above. This host apparatus is comprised of a communication controller for forwarding a transmission request to said terminal apparatus and for receiving from said terminal apparatus a reply corresponding to the transmission request, an identification information establishing unit for extracting a timer value obtained from a timer contained in said terminal apparatus from the reply, which is received from the terminal apparatus by said communication controller, and for establishing identification information for the terminal apparatus according to the extracted timer value, and a polling unit for implementing polling to the terminal apparatus using the identifying information established by said identification information establishing unit.

According to the above mentioned features, a user of the terminal apparatus and the host apparatus is not required to execute special and complicated operations in order to establish identification information of each terminal apparatus. Therefore, the present invention can greatly reduce the operational difficulties of the data transmission system.

BRIEF EXPLANATION OF DRAWINGS

The above object and features of the present invention will be more apparent from the following description of the preferred embodiments with reference to the accompanying drawings, wherein:

FIG. 11 is a view showing a table indicating the relation between terminal apparatus and their IDs stored in the host apparatus.

DESCRIPTION OF THE PREFERRED EMBODIMENTS

Figure 1:
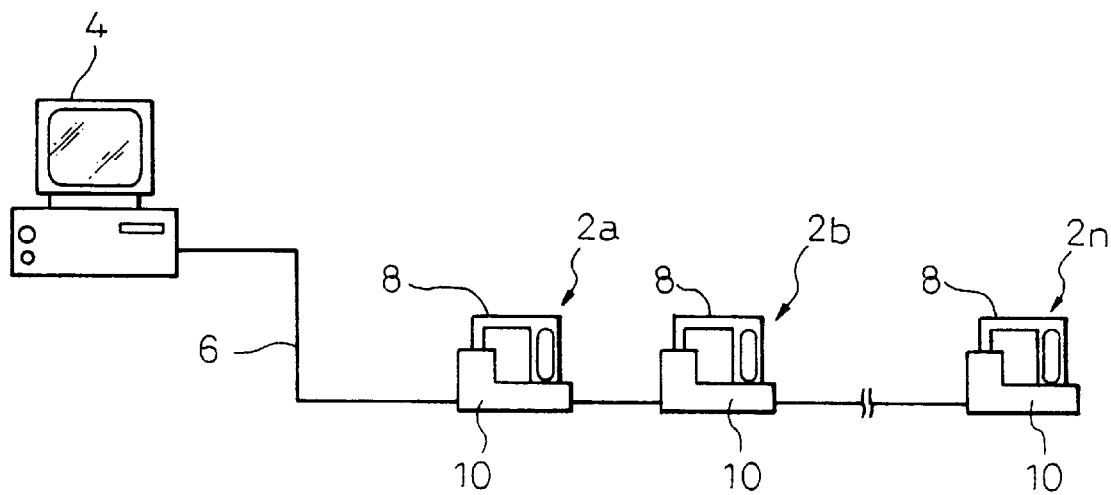
FIG. 1 is a view illustrating a data transmission system according to one embodiment of the present invention.

FIG. 1 shows an example of data transmission system according to one embodiment of the present invention. As shown in FIG. 1 a plurality of terminal apparatuses (terminal station) 2a, 2b, . . . 2n may be connected with a host apparatus (host station) 4 through a communication line 6. In the case shown in FIG. 1, the terminal apparatuses 2a, 2b, . . . 2n are serially connected with each other with respect to the host apparatus 4.

Figure 2:
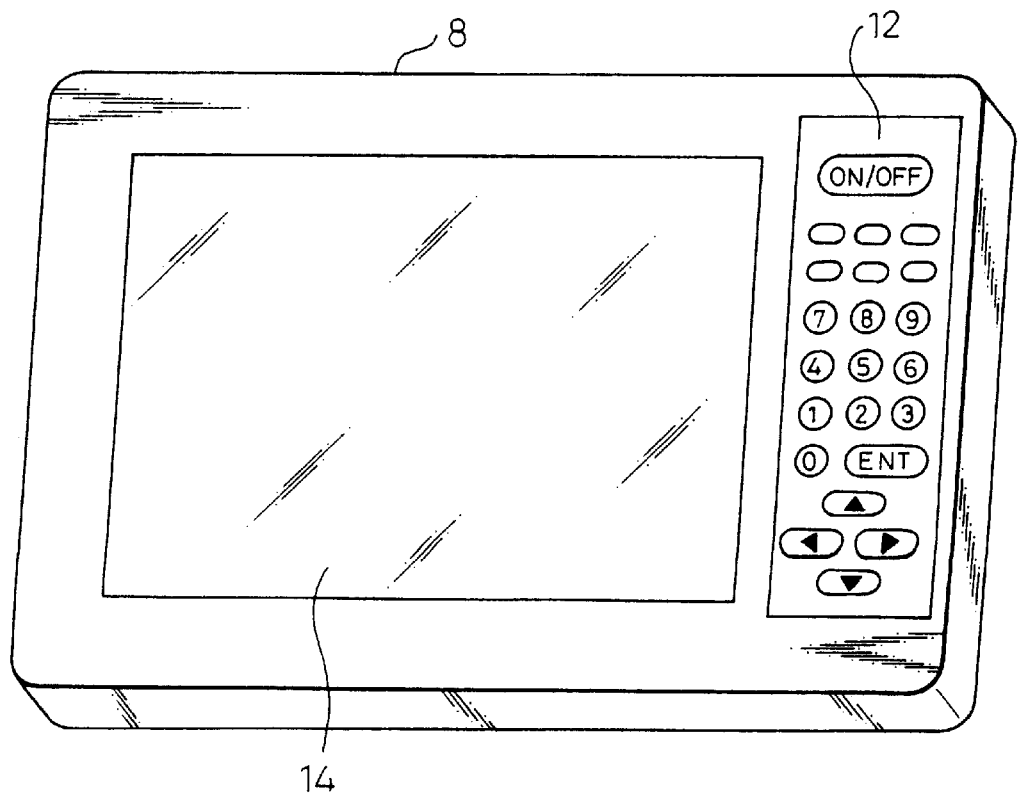
FIG. 2 is a view illustrating a portable terminal used in the data transmission system shown in FIG. 1.

In one embodiment, host apparatus 4 comprises a host computer such as a general purpose computer, minicomputer or a workstation, and each terminal apparatus 2a, 2b, . . . or 2n is comprised of a communication adapted 10 and a hand-held type portable terminal 8 as shown in FIG. 2. In another embodiment, each terminal apparatus may comprise a personal computer. In still another embodiment, each terminal apparatus may comprise a POS (point-of-sale) terminal. In a further embodiment, a hand-held type portable terminal, a personal computer and a POS terminal may coexist as the terminal apparatuses.

As mentioned above, in the embodiment shown in FIG. 1, each terminal apparatus 2 (2a, 2b, . . . or 2n) comprises a hand-held type terminal device (referred to as portable terminal, below) 8 and a communication adapter 10. Portable terminal 8 is disconnectable from terminal adapter 10 and it is usually carried by a user to collect data at a desired place. The collected data are stored in this portable terminal 8 temporarily. The communication adapter (or a connection adapter) 10 is usually placed at a particular place and connected to the communication line, for example, a telephone line.

The portable terminal 8 is carried for use by a user, and therefore, is driven by a battery incorporated therein as a power supply. As shown in FIG. 2, each portable terminal 8 is a hand-held terminal and comprises an input part 12 for inputting various kinds of information by a user and a display part 14 for displaying, for example, inputted information and instructions. Various kinds of input devices have been known such as a key board and a touch panel. Since the structural differences between these input devices are not directly related to the implementation of the present invention, the structure of such an input device will not be described in detail here.

The terminal apparatus 2 is used typically as follows. A user carries the portable terminal 8 when he or she is collecting data, for example, in a store or a warehouse. The collected data are input and stored temporarily into the portable terminal 8. When a certain amount of data is accumulated in the portable terminal 8, or, for example, at a predetermined time, the user moves to a particular place, where the connection adapter 10 is placed, and inserts terminal 8 into the adapter 10 to start data transfer to the host apparatus 4. The connection adapter 10 is not always placed at a particular place. It may be carried by the user and fixed to a communication line, for example, a telephone line whenever he or she wants to transmit data. Thus, the user can transfer data to the host apparatus through a telephone line from any place where a telephone is available.

It is also possible to use radio-communication system for transmitting data from portable terminal 8 to the host apparatus 4 by suitably setting the feature of the communication adapter 10. In this case, the user can send data to the host apparatus 4 from any place where radio-communication is possible.

The portable terminal 8 is advantageous in that a user can input and display information through it while it is carried. Therefore, it is conveniently used for stock management of stores or warehouses, shipping management of luggage, inspection of power meters, etc. In the case of stock management, for example, a user can input a name of an item (including item codes) and a stock number for each item in a store while carrying a portable terminal. As such, stock information can be collected by inputting necessary data into the portable terminal.

The collected data are transferred to the host apparatus, for example, host computer, and they are processed to obtain necessary information. A method that uses a communication adapter for data transmission from a portable terminal to a host computer is widely known. In this method, a portable terminal is inserted into a communication adapter, which is connected to a host computer through a communication line, and information stored in the portable terminal is transferred to the host computer through the communication adapter. A connector for forwarding and receiving information is provided, respectively, for each of the portable terminals and the adapters.

Figure 3:
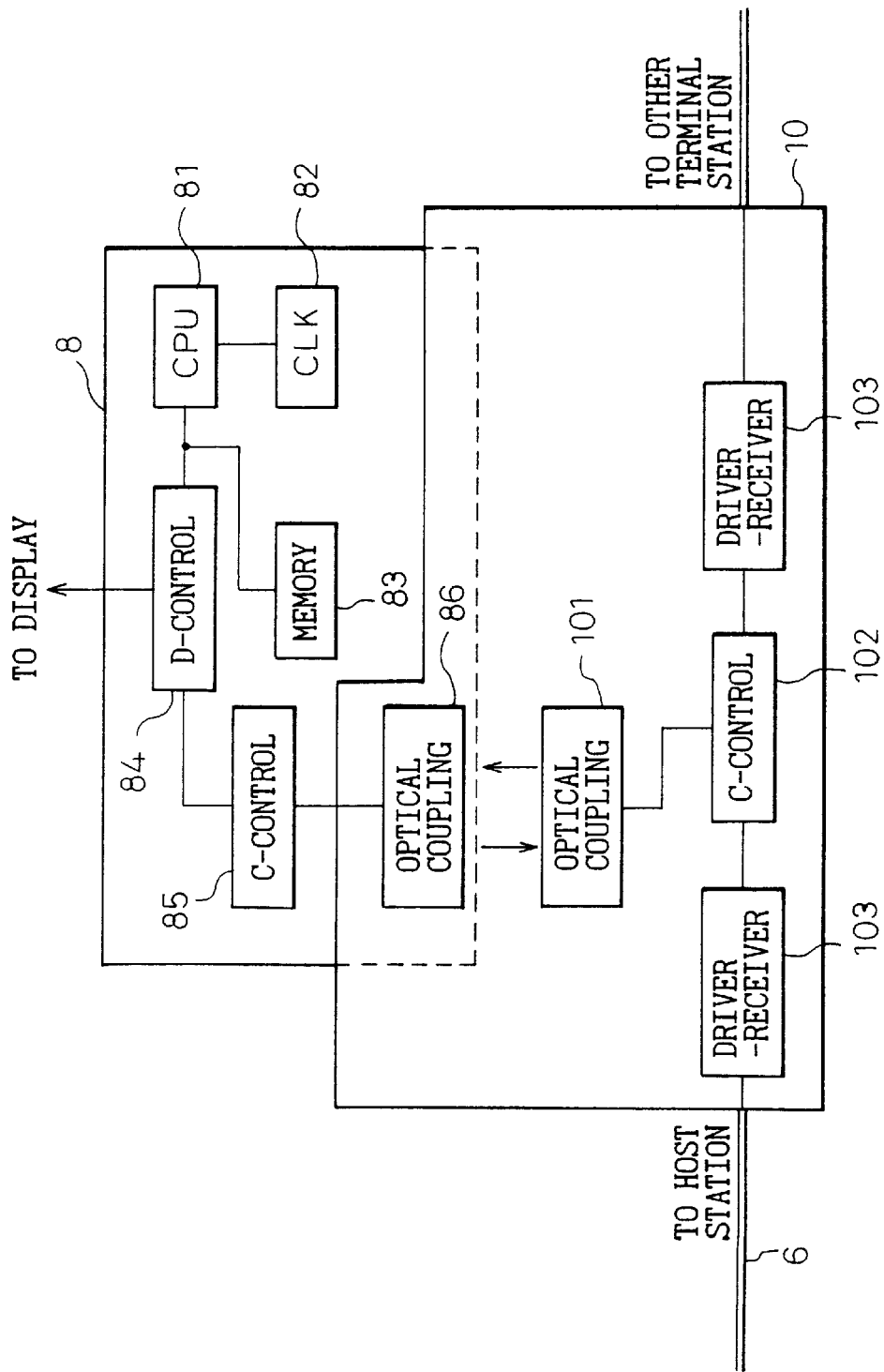
FIG. 3 is a block diagram showing the structures of a portable terminal and a communication adapter used in the data transmission system shown in FIG. 1.

FIG. 3 is a block diagram showing the internal structure of a portable terminal 8 and a communication adapter 10 according to one embodiment of the present invention.

The portable terminal 8 includes a control unit (CPU) 81, a clock (CLK, real-time clock) 82, a memory 83 for storing inputted information and operational programs, a display control unit (D-CONTROL) 84, and a communication control unit (C-CONTROL) 85. In addition, a connecting unit 86 having a light emitting device and a light receiving device is provided to the portable terminal 8.

On the other hand, the communication adapter 10 is provided with a connecting unit 101 having a light receiving device and a light emitting device, a communication control unit (C-CONTROL) 102, and driver/receiver units 103 and 104 for forming an interface to the communication line 6.

As shown in FIG. 3, the connecting unit 86 in portable terminal 8 and the connecting unit 101 in communication adaptor 10 form an optical coupling for data transfer.

Since the portable terminal 8 is frequently installed into and removed from the communication adapter 10, the connection part between them might be easily broken if it is made from a mechanical connector. Therefore, a non-contact connector using an optical coupling is preferable.

Once the portable terminal 8 is installed into the communication adapter 10, the necessary steps for establishing a communication between them are carried out in the respective communication control units 85 and 102. When communication between portable terminal 8 and communication adapter 10 becomes possible, information stored in memory 83 of portable terminal 8 is read out and transferred to host apparatus 4 through driver 103 in communication adapter 10 and communication line 6. Thus, collected information in portable terminal 8 is transferred to the host apparatus 4.

In one embodiment of the present invention, CPU 81 in portable terminal 8 has an ability to establish its ID for use in polling operation with the host apparatus, according to a system timer value obtained from real time clock 82. In actuality, once the portable terminal 8 has been activated and installed into communication adapter 10, CPU 81 observes when the present terminal can communicate through the communication adapter 10. As soon as the portable terminal can communicate, CPU 81 finds the value of the system timer at this moment from CLK 82 and stores it in memory 83 as an ID value or information for determining an ID of this portable terminals.

Figure 4:
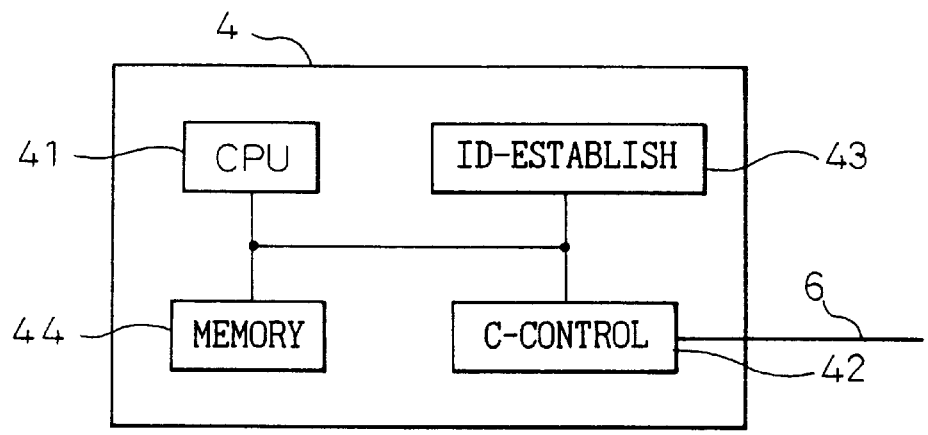
FIG. 4 is a block diagram showing the structure of a host apparatus used in the data transmission system shown in FIG. 1.

FIG. 4 shows the internal structure of the host apparatus 4. As shown, the host apparatus 4 is provided with a control unit (CPU) 41 for controlling the operation of this apparatus, a communication control unit (C-CONTROL) 42 for controlling the communication with portable terminals through the communication line 6, an ID establishing unit 43 for determining an ID for each portable terminal according to the information received from the portable terminal 8, and a memory unit 44 for storing information received from portable terminals 8 and programs for operating the apparatus itself. The control unit 41 also controls a polling operation between the host apparatus and terminal apparatus 2 connected to this host apparatus through communication line 6. The detailed operation of the respective units will be described later.

Next, the polling operation between the host apparatus 4 and terminal apparatus 2, according to the present invention, will be described below.

Figure 5:
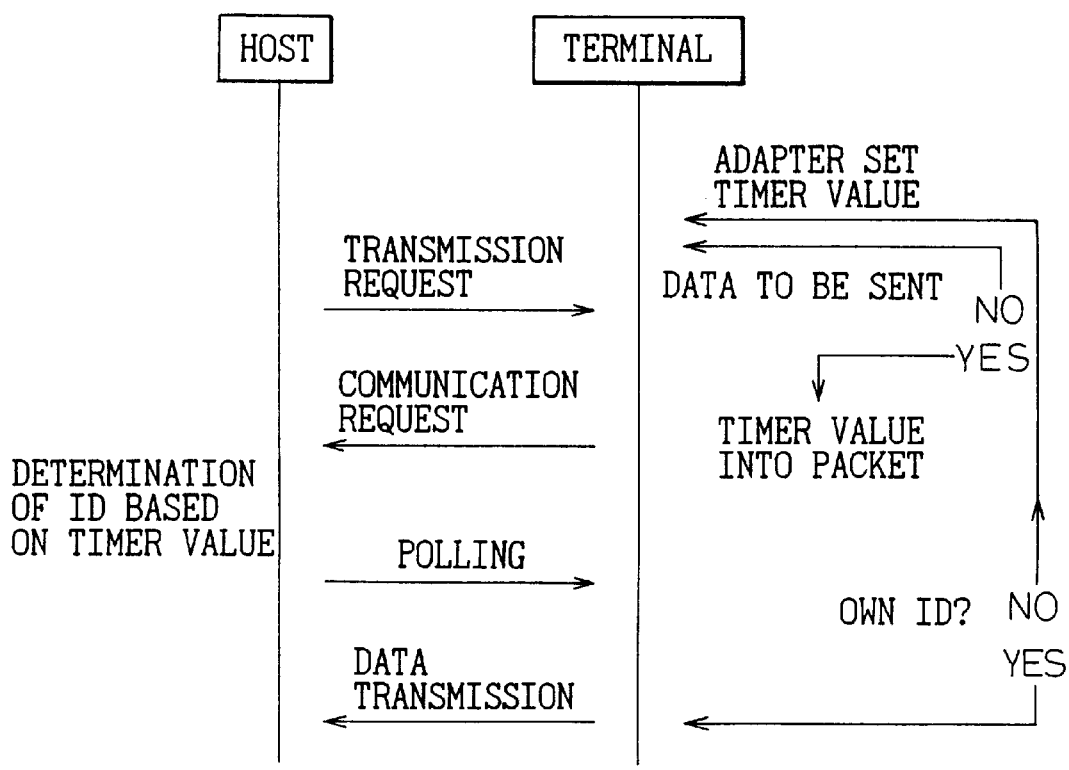
FIG. 5 is a time-chart showing the communication procedure between a host apparatus and a terminal apparatus according to one embodiment of the present invention.

FIG. 5 is a time chart for explaining the transmission procedure between terminal apparatus 2 and the host apparatus 4. When collecting information from the terminal apparatus, host apparatus 4 forwards a transmission request on the communication line 6. This transmission request is to ask if any terminal on the line has data to be transferred to the host, and therefore, the request is not forwarded to a particular terminal but to every terminal apparatus on the communication line. As a result, any terminal apparatus connected to the communication line is capable of receiving the transmission request from the host apparatus 4 simultaneously as long as it can communicate.

Once terminal apparatus 2 can communicate, the system timer value at this moment is determined by CPU 81 from clock 82 and stored in memory 83, as shown in FIG. 5. Then, terminal apparatus 2 monitors the line for a transmission request from host apparatus 4. When terminal apparatus 2 receives a transmission request from host apparatus 4, it sends a communication request back to host apparatus 4. This communication request comprises a transmission packet in which the system timer value is incorporated. A detailed explanation of the system timer value will be given later.

When host apparatus 4 receives the communication request from terminal apparatus 2, the system timer value contained in the transmission packet is detected and set to be the ID (identifier) of terminal apparatus 2, which sent the transmission packet, by ID-establishing unit 43. Then, host apparatus 4 implements a polling operation according to the ID thus determined.

Terminal device 2, which has forwarded the communication request to host apparatus 4, monitors the polling operation from host apparatus 4 and waits until its ID is included in the polling operation. When terminal apparatus 2 detects its ID in the polling operation, it forwards collected information stored in memory 83 to host apparatus 4. In a case where its own ID is not included in the polling operation, terminal apparatus 2 waits until the next transmission request arrives.

Figure 6:
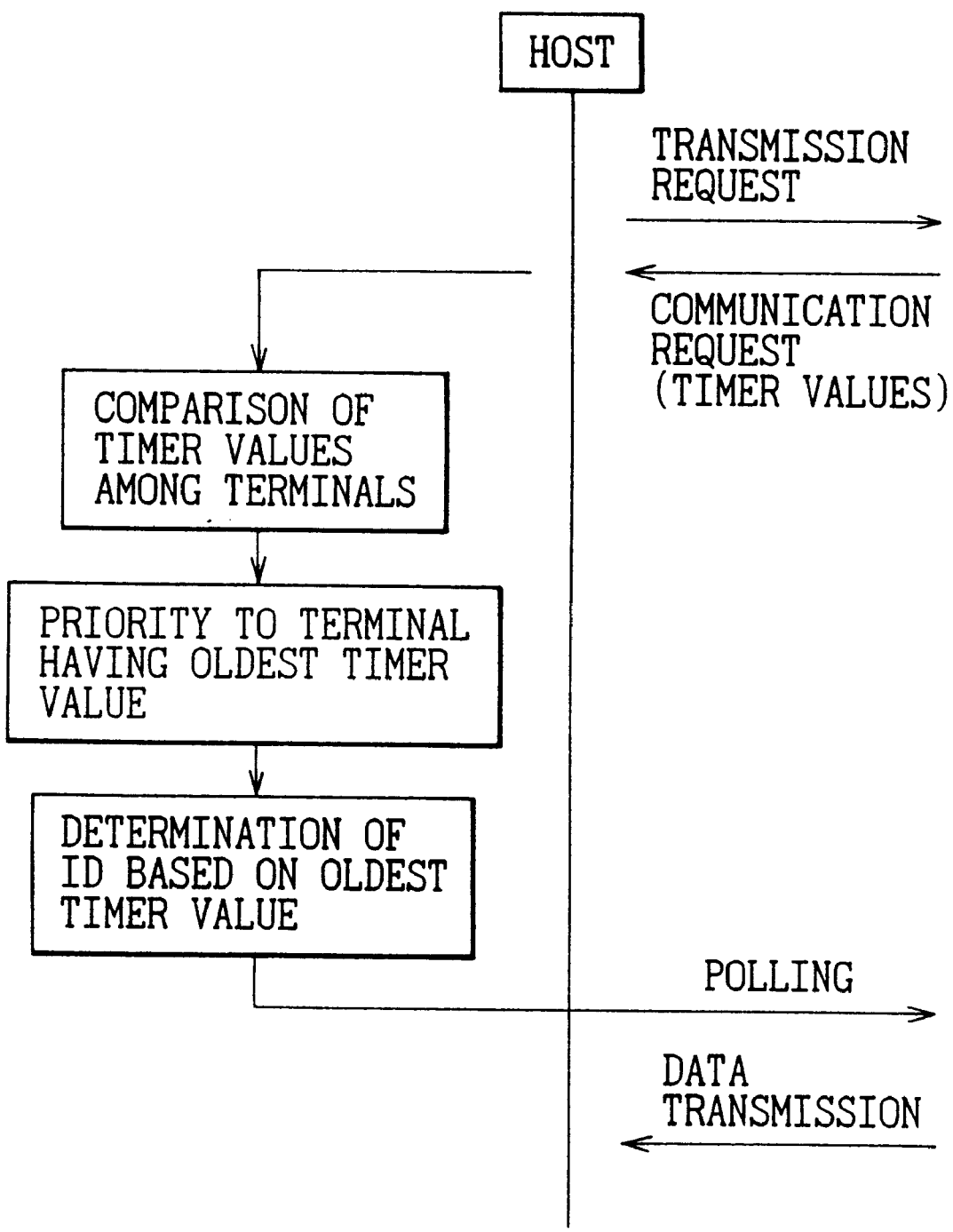
FIG. 6 is a time-chart showing the communication procedure between a host apparatus and a terminal apparatus according to another embodiment of the present invention.

The transmission procedure shown in FIG. 5 is simplified in the case where only one terminal apparatus 2 is connected to communication line 6 and sends out a transmission request to host apparatus 4. Usually, however, a plurality of terminal apparatuses are connected to send transmission requests simultaneously to host apparatus 4. The time chart shown in FIG. 6 corresponds to such a case.

When a plurality of terminal apparatus 2 are connected to communication line 6, host apparatus 4 may receive a plurality of communication requests from these terminal apparatus simultaneously since a transmission request from host apparatus 4 is not intended to be forwarded to a particular terminal apparatus 2. When receiving a plurality of communication requests from terminal apparatus 2, host apparatus 4 compares the respective received system timer values with each other and detects the oldest system timer value among them. Then, host apparatus 4 selects the terminal apparatus 2, which forwarded the oldest system timer value, to give it priority.

Once the priority has been given to a particular terminal apparatus, the ID for this apparatus is established according to the timer value of this apparatus and polling is conducted using this ID to the respective terminal apparatus in the same manner as mentioned with reference to FIG. 5.

Figure 7:
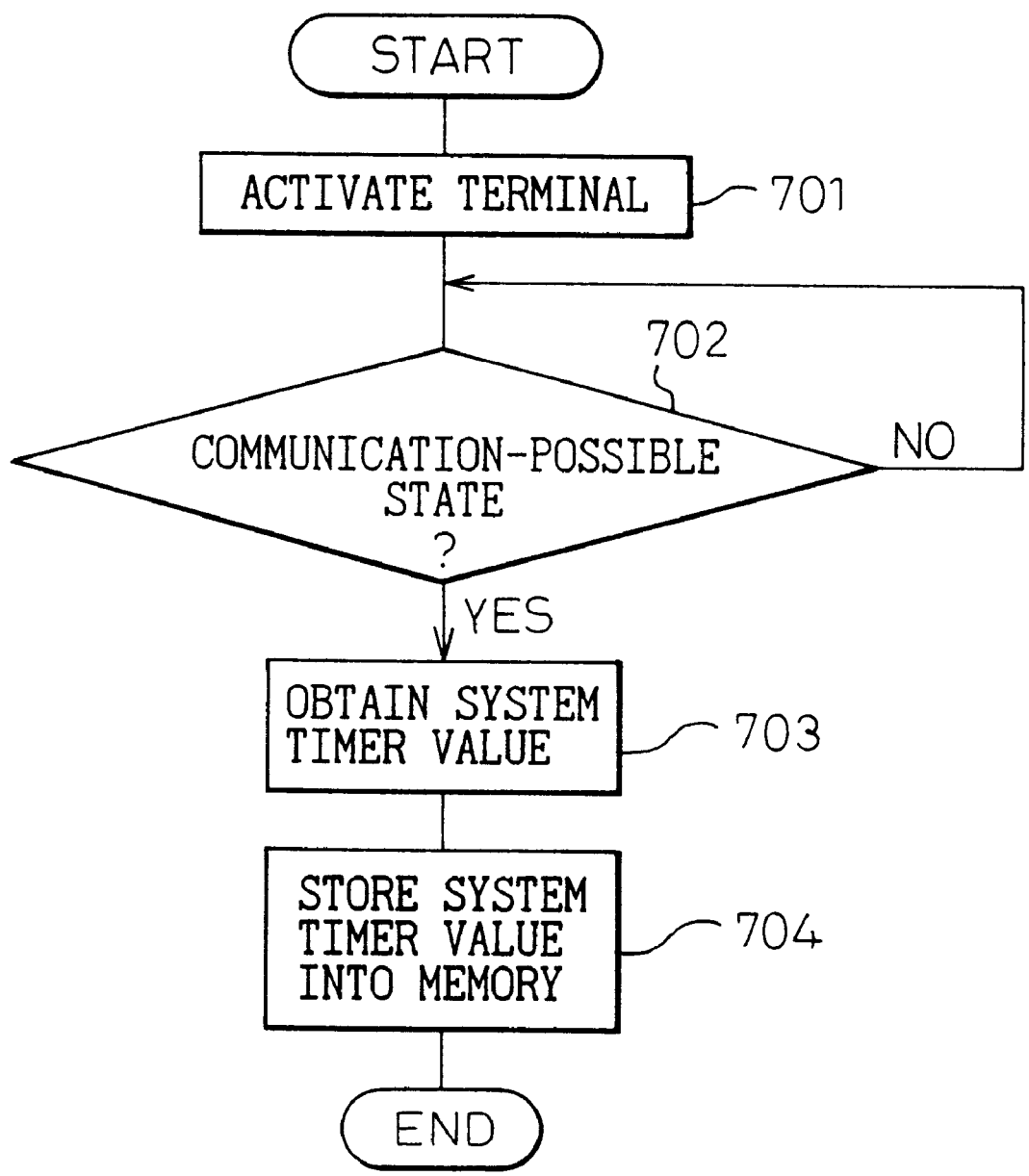
FIG. 7 is a flowchart showing the communication procedure between a host apparatus and a terminal apparatus according to one embodiment of the present invention.

FIG. 7 is a flowchart for showing the procedure to obtain a system timer value in a terminal apparatus. A terminal apparatus is activated and installed into communication adapter at step 701. At step 702, it is determined if the terminal apparatus can communicate. In case that the terminal apparatus can communicate, the present value of a system timer contained in this terminal apparatus is obtained at step 703 and stored into a memory at step 704.

Figure 8:
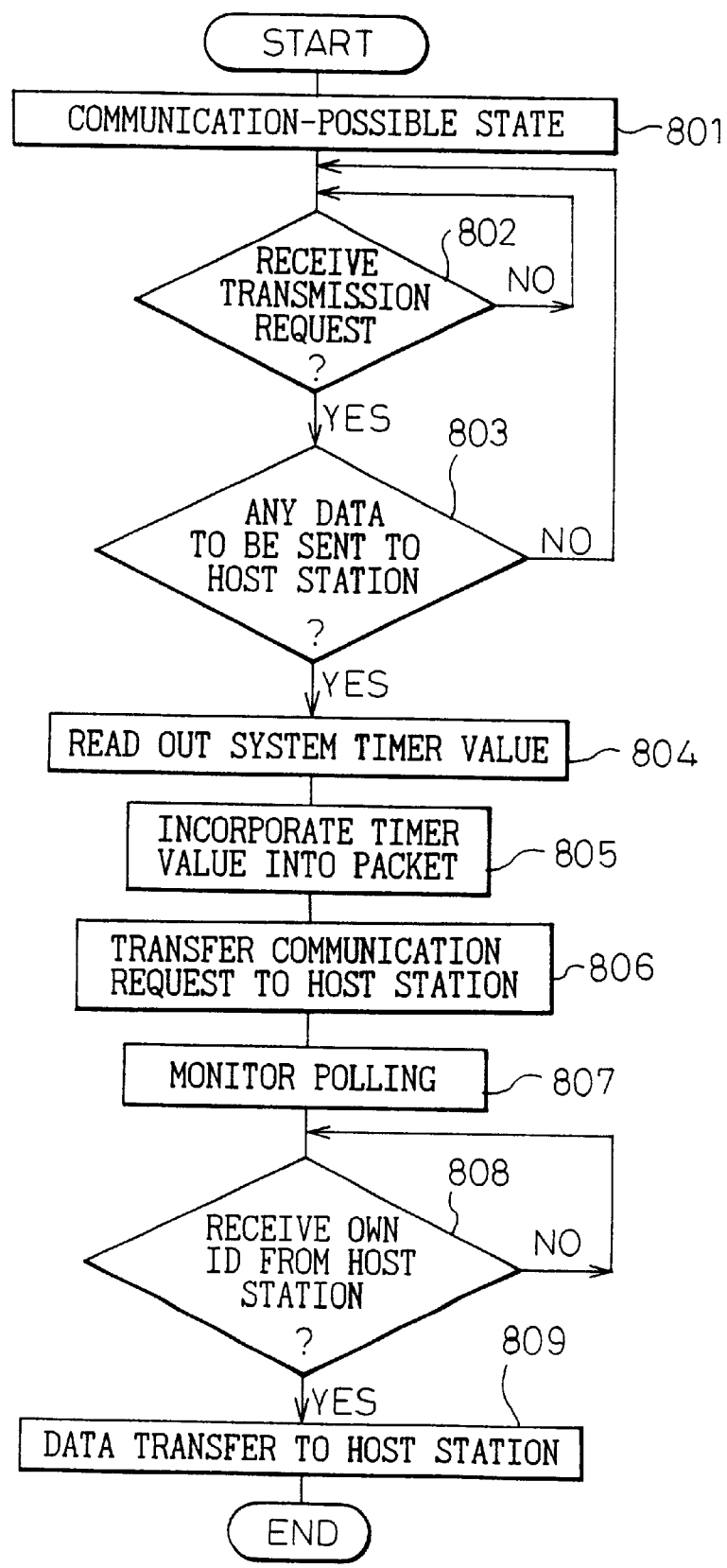
FIG. 8 is a flowchart showing the procedure for forwarding a communication request from a terminal apparatus to a host apparatus according to one embodiment of the present invention.

FIG. 8 is a flowchart for showing the procedure to transfer data, stored in the terminal apparatus, to the host apparatus.

When the terminal apparatus can communicate, as shown in step 801, it begins to watch for a transmission request from the host apparatus at step 802. If the transmission request is received, whether or not the terminal apparatus has data to be forwarded to the host apparatus is detected at step 803. If data is to be forwarded, the system timer value stored in the memory of the terminal apparatus is read out at step 804 and incorporated into a transmission packet at step 805.

Figure 9:
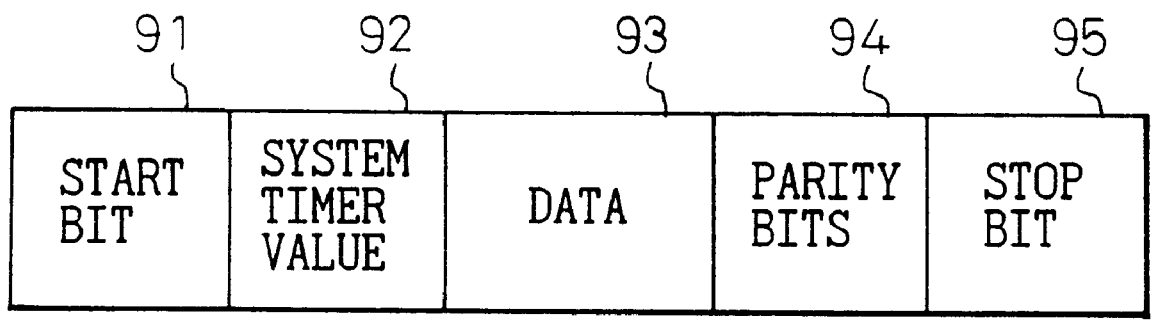
FIG. 9 is a view showing an example structure of a transmission packet according to one embodiment of the present invention.

FIG. 9 shows one example of the transmission packet. In this example, a start bit and a stop bit are provided in the front region 91 and in the end region 95 of this packet. After the start bit region 91, a region 92 for holding a system timer value is provided. Accordingly, the system timer value read out from the memory is written into this region 92. In the data region 93, the data to be transferred to the host apparatus are written. The data for making this packet to be a communication request also written into this region 93. A parity bit region 94 is provided after the data region 93.

The system timer value having been incorporated into the packet as shown in FIG. 9, the terminal apparatus forwards the transmission packet to the host apparatus as the communication request at step 806. Then, the terminal apparatus waits for polling from the host apparatus, at step 807. When polling is detected, the terminal apparatus determines if its own ID is included in the polling, at step 808. If its own ID is included in the polling, the terminal apparatus forwards the collected data to the host apparatus, at step 809.

Figure 10:
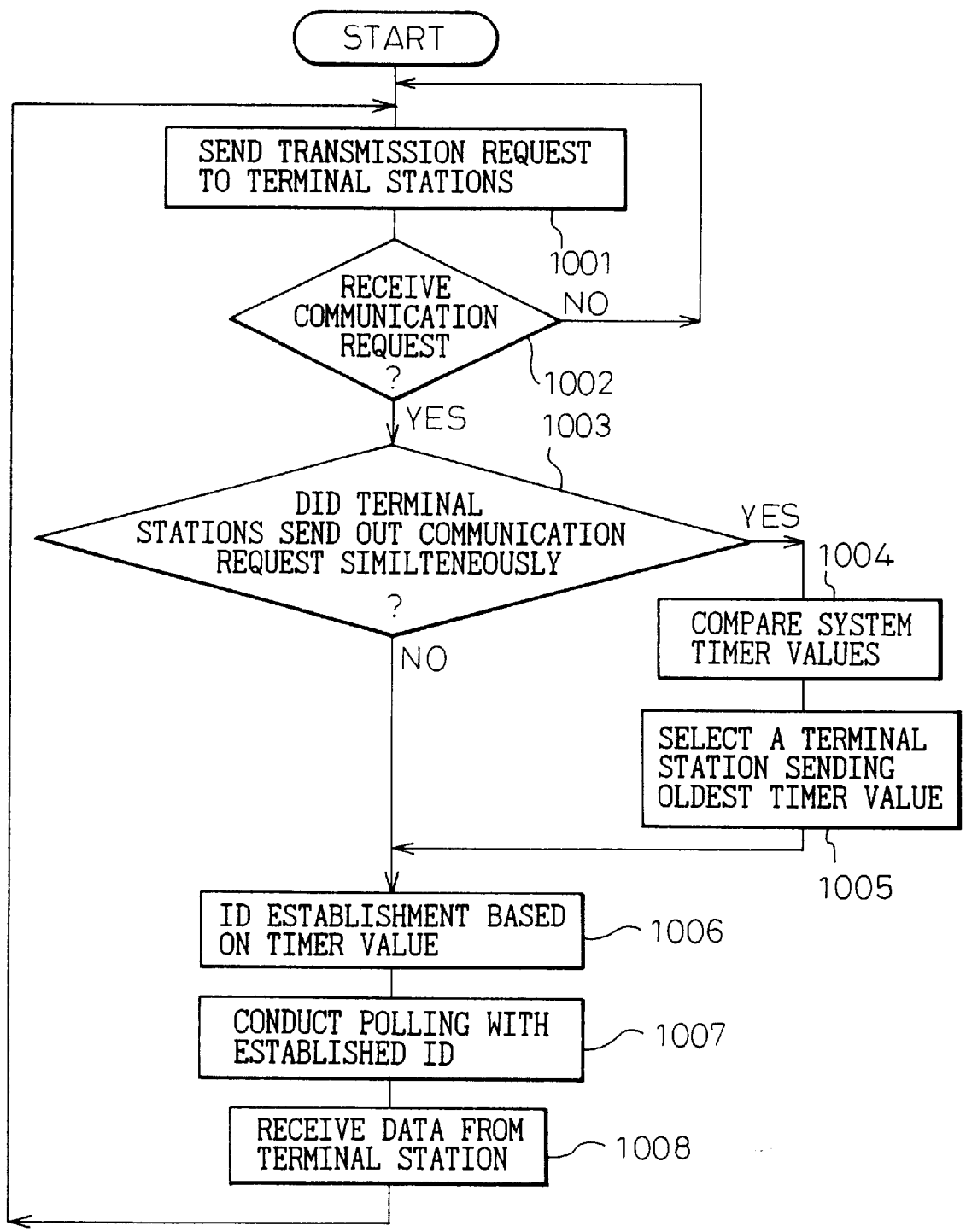
FIG. 10 is a flowchart showing polling operation by a host apparatus according to one embodiment of the present invention.

FIG. 10 is a flowchart showing the polling procedure by the host apparatus. At step 1001, the host apparatus forwards a transmission request to a plurality of terminal apparatuses connected to the communication line to ask if they have information to be forwarded to the host apparatus. After having forwarded the transmission request, the host apparatus determines if it has received any communication request from the terminal apparatus at step 1002. If no communication request is received, the host apparatus forwards the transmission request again. On the other hand, if a communication request is received at step 1002 from any of the terminal apparatus, the host apparatus checks if another communication request is received for the transmission request from other terminal apparatus at step 1003. Because a plurality of terminal apparatuses are connected to the communication line and a transmission request is not forwarded to a particular terminal apparatus, the host apparatus may receive a plurality of communication requests simultaneously from several terminal apparatuses.

If the host apparatus receives a plurality of communication requests simultaneously, the host apparatus compares the system timer values contained in transmission packets from the respective terminal apparatus with each other, at step 1004. Since the system timer values contain time-relating information, one embodiment of the present invention selects the oldest system timer value according to the comparison and gives the priority to the terminal apparatus which has forwarded the transmission packet having the oldest system timer value, at step 1005.

When a terminal apparatus has the oldest system timer value, this apparatus indicates that it was connected to a communication adapter before any other terminal apparatus was connected to communication adapters. After the terminal apparatus has finished forwarding data to the host apparatus, it does not respond to a new transmission request from the host apparatus since it has no data to forward, and therefore, no communication request should be forwarded to the host apparatus. Accordingly, by giving a priority to a terminal apparatus which forwarded the oldest timer value, data collection can be executed for a terminal apparatus which was connected to a communication adapter before any other terminal apparatus was connected to terminal adapters.

When the priority is given to a particular terminal apparatus as mentioned above, the host apparatus extracts the system timer value incorporated into the transmission packet and establishes an ID for the terminal apparatus according to the extracted system timer value, at step 1006. In actuality, the system timer value itself is established as the ID.

If the ID has already been registered in a table mentioned later, a new ID establishment is not required to be conducted again. The details of this will be explained later with referring to FIG. 11.

Once the ID is established as mentioned above, the host apparatus conducts polling according to the established ID, at step 1007. The terminal apparatus having the ID forwards data corresponding to the polling, and then, the host apparatus receives the data, at step 1008.

As mentioned above, according to the present embodiment, an ID given to the respective terminal apparatus is not peculiar to the apparatus itself, but can be varied at a proper occasion. In addition, since the present embodiment establishes the ID by utilizing a timer value of a system timer which is usually provided in any terminal apparatus, additional hardware is not required to establish the ID. Further, the present embodiment does not require a fixed ID peculiar to each terminal apparatus and, therefore software for forming the ID becomes simple. In order to obtain the timer value, one embodiment of the present invention only requires that a portable terminal be set to a communication adapter. However, this is not a special effort to obtain the ID since this is required to establish a communication between the portable terminal and a host. As a result, the present embodiment can set an ID for a portable terminal almost automatically by simply installing the remote terminal into a communication adapter, which installing has been required also in a conventional data transmission system. Therefore, the present embodiment greatly improves the utility of the portable terminal for the users of this terminal.

In the above mentioned embodiment, it may be possible that a plurality of terminal apparatus have the same timer value with each other simultaneously. However, this situation can be neglected for the reasons mentioned below.

In the data transmission system according to the present embodiment, not more than 20 portable terminals are connected simultaneously to a communication line. The probability that more than one portable terminals are simultaneously connected to the line can be considered very small due to the small number of the portable terminals. In addition, by measuring the system timer value to a several places of decimals, the probability that more than one portable terminals have the same system timer values simultaneously can be reduced to a value which can be considered to be almost zero. Such a precise measurement of the system timer value is possible with a portable terminal in the present situation.

In the above embodiment, a portable terminal is used as a terminal apparatus, however, the present invention is applicable to a data transmission system having a plurality of personal computers as terminal apparatuses. In this case, the personal computer is not set to a communication adapter. It is, however, possible to program the personal computer to obtain the system timer value when it is turned on.

In the above mentioned embodiments, the host apparatus establishes an ID for a terminal apparatus using a system timer value itself. For security reasons, this system timer value can be processed to obtain an ID. Or, a particular arithmetic operation can be applied to the system timer value to obtain an encrypted ID. This operation or processing to obtain the encrypted ID from the system timer value can be carried out in either the portable terminal 8 or the host apparatus 4.

FIG. 11 shows an example of a table which is stored in a memory of a host apparatus. In the above mentioned embodiment, the ID establishment is carried out every time a transmission request is forwarded to a terminal apparatus. However, a situation arises where the second or third ID setting is not always necessary once an ID has been established.

In such a case, for example, the portable terminal is formed or programmed so that the system timer value stored in a memory is not reset, once the portable terminal can communicate, unless it is removed from a communication adapter. Therefore, once an ID has been established for a certain portable terminal, polling using the ID should be conducted until the portable terminal is removed from the communication adapter.

In order to deal with the above case, the table shown in FIG. 11 is stored in a memory of the host apparatus. Then, when receiving a communication request, the host apparatus determines if the system timer value contained in the communication request has already been registered in the table as an ID. If the received system timer value has not been registered, an ID is established according the received system timer value. On the contrary, if the system timer value has already been registered in the table, no further ID establishing process is conducting.

As explained hereinbefore using various embodiments, the data transmission method according to the present invention need not establish an ID fixed to a respective terminal apparatus. Therefore, the present invention is able to save time and labour which is required to establish and re-establish an ID for a respective terminal apparatus. In addition to this, the ID management process becomes simple according to the present invention.

The respective terminal apparatus uses a system timer value, derived from a timer contained therein, to form its own ID, thus easily establishing its own ID. In case that a terminal apparatus including a system timer is used, additional hardware is not necessary to establish an ID.

Particularly, if a portable terminal, which necessitates a communication adapter, is used, its own ID can be formed according to a system timer value obtained at the moment the portable terminal is set into the adapter. Therefore, a user is not required to practice any special effort for establishing the ID. This is because the portable terminal must be set into the communication adapter whenever a communication is required between the portable terminal and a host apparatus.

In case that a plurality of communication requests are forwarded to the host apparatus, priority is given to a particular terminal apparatus according to a timer value. If the respective terminal apparatuses have fixed IDs as is the case of the prior art data transmission method, priority is given to a predetermined terminal apparatus. However, according to the present invention, the ID of a terminal apparatus is variable, and therefore, giving priority according to timer values, which form the respective IDs, is very advantageous. Especially, by giving priority in sequence from the oldest timer value, the priority can be transferred one after another among a plurality of terminal apparatuses.

What is claimed is:

1. A terminal apparatus for use in data transmission with a host apparatus, comprising:
   a timer;
   a memory for storing a value of said timer when the terminal apparatus can communicate with the host apparatus; and
   a controller for forwarding a reply to a transmission request which is received from the host apparatus, said controller incorporating said timer value into the reply as identification information of said terminal apparatus and forwarding it to the host apparatus.

2. The terminal apparatus according to claim 1, wherein said terminal apparatus comprises a personal computer.

3. The terminal apparatus according to claim 1, wherein the terminal apparatus can communicate when it is turned on.

4. A terminal apparatus, for use in data transmission with a host apparatus, comprising:
   a communication adapter connected with the host apparatus through a communication line; and
   a portable terminal which is connectable with the host apparatus through said communication adapter, said portable terminal including,
   a timer;
   a memory for storing a value of said timer when the terminal apparatus can communicate; and
   a controller for forwarding a reply for a transmission request which is received from the host apparatus, said controller incorporating said timer value into the reply as identification information of said portable terminal apparatus and forwarding it to the host apparatus through said communication adapter.

5. The terminal apparatus according to claim 4, wherein said portable terminal is a hand-held terminal.

6. The terminal apparatus according to claim 4, wherein said terminal apparatus can communicate with the host apparatus when the portable terminal is connected with the communication adapter.

7. A terminal apparatus, to be attached to a communication adapter, which transmits data to and from an external device through the communication adapter, comprising:

a timer;

a memory for storing a value of the timer at the time the terminal apparatus can communicate; and a controller for forwarding a communication request to the external device when the terminal apparatus receives a transmission request from the external device, wherein the controller sends the timer value stored in the memory as identification information of said terminal apparatus with the communication request.

8. The terminal apparatus according to claim 7, wherein the memory stores a value of the timer at the time when the terminal apparatus is attached to the communication adapter.

9. The terminal apparatus according to claim 7, wherein the memory stores a value of the timer at the time when the terminal apparatus is turned on.

* * * * *